United States Patent
Kobayashi et al.

(10) Patent No.: US 6,563,493 B2
(45) Date of Patent: *May 13, 2003

(54) MOLDED ARTICLE OF PEN TIP OF INPUT PEN FOR COORDINATE INPUT APPARATUS, METHOD OF MOLDING PEN TIP AND MOLD THEREFOR

(75) Inventors: Katsuyuki Kobayashi, Yokohama (JP); Atsushi Tanaka, Yamato (JP); Yuichiro Yoshimura, Kamakura (JP); Ryozo Yanagisawa, Inzai (JP); Hajime Sato, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,995

(22) Filed: Jun. 29, 1998

(65) Prior Publication Data

US 2002/0063700 A1 May 30, 2002

(30) Foreign Application Priority Data

Jun. 30, 1997 (JP) .............................................. 9-174508
Jul. 23, 1997 (JP) .............................................. 9-197161

(51) Int. Cl.$^7$ .......................... G09G 5/00; G06K 11/06; G06K 11/14; G08C 21/00
(52) U.S. Cl. .................... 345/179; 345/173; 178/18.01; 178/18.03; 178/18.04
(58) Field of Search ................................ 345/179, 169, 345/173; 264/145; 73/862; 528/272

(56) References Cited

U.S. PATENT DOCUMENTS

| | | | | | |
|---|---|---|---|---|---|
| 3,671,616 | A | * | 6/1972 | Nakata et al. | 264/68 |
| 4,597,932 | A | * | 7/1986 | Kurihara et al. | 264/145 |
| 4,705,943 | A | * | 11/1987 | Budrikis et al. | 250/227 |
| 5,096,322 | A | * | 3/1992 | Shiga et al. | 401/199 |
| 5,177,472 | A | * | 1/1993 | Taniishi et al. | 340/706 |
| 5,290,972 | A | * | 3/1994 | Someya et al. | 178/18 |
| 5,401,917 | A | * | 3/1995 | Yoshida et al. | 178/18 |
| 5,484,967 | A | * | 1/1996 | Yanagisawa et al. | 345/177 |
| 5,565,632 | A | * | 10/1996 | Ogawa | 73/862.69 |
| 5,850,058 | A | * | 12/1998 | Tano et al. | 178/18 |
| 5,898,427 | A | * | 4/1999 | Okamoto | 345/179 |
| 6,075,114 | A | * | 7/2000 | Umetsu et al. | 528/272 |
| 6,143,385 | A | * | 11/2000 | Furuya et al. | 428/36.9 |

FOREIGN PATENT DOCUMENTS

JP          1-114924          5/1989

* cited by examiner

Primary Examiner—Steven Saras
Assistant Examiner—Alecia D. Nelson
(74) Attorney, Agent, or Firm—Fitzpatrick, Cella, Harper & Scinto

(57) ABSTRACT

A molded article of a pen tip of an input pen for a coordinate input apparatus for inputting oscillation to an oscillation transmitting plate, detecting oscillation propagating through the oscillation transmitting plate and detecting indicated coordinates is molded by injecting a composition containing at least liquid crystalline resin into a mold member for molding the configuration of the pen tip. In a mold for the pen tip, at least one gate is formed in a molding member such that the gate is disposed at a position symmetric with respect to the center axis of the pen tip.

13 Claims, 11 Drawing Sheets

MOLDED ARTICLE OF PEN TIP OF INPUT PEN FOR COORDINATE INPUT APPARATUS, METHOD OF MOLDING PEN TIP AND MOLD THEREFOR

BACKGROUND OF THE INVENTION

1. Field of the Invention

This invention relates to a molded article of a pen tip of an input pen for a coordinate input apparatus, a mold for molding the pen tip and a method of molding the pen tip.

2. Related Background Art

As a coordinate input apparatus, there is known one which detects elastic wave oscillation input from an input pen by a plurality of sensors provided on an oscillation transmitting plate, and detects the coordinates pointed to by the input pen. The tip of the input pen of such a coordinate input apparatus is described, for example, in Japanese Patent Laid-Open Application No. 1-114924. The pen tip described in this patent application is formed of polyamide-imide, which is a resin, and has satisfied the characteristics (1) that it is excellent in wear resistance and resists wear due to friction or the like during the inputting of coordinates, and (2) that it can transmit oscillation created in the input pen efficiently without attenuating the oscillation.

However, the tip of the input pen of the above-described prior-art coordinate input apparatus has used polyamide-imide, which is a resin, as the material thereof and therefore has been made moldable and has been expected to be capable of being made into a construction excellent in mass production, but the following problem has arisen in the tip of the molded input pen.

When an input pen incorporating the molded tip therein has been brought into contact with an oscillation transmitting plate perpendicularly thereto and the input pen has been rotated about the axis of the input pen, there has been found a phenomenon that the waveform of a signal detected by the sensor changes. That is, when the oscillation input from the input pen propagates in the form of a ripple from an input point on the oscillation transmitting plate as the center of the ripple, there arises a phenomenon that the waveform of the detected signal differs depending on the direction of the input pen. This phenomenon is called directionality, and has harmful effects as will be described below.

In the prior-art coordinate input apparatus, it is the basic principle to derive a distance by the use of the transmission time of a sound wave and the sound velocity of a wave and therefore, it is of course desired that the sound velocity be constant in a propagating body and that a detection signal waveform detected by the sensor always be of the same shape. That is, even if as shown in FIG. 8 of the accompanying drawings, oscillation is input at the same point, the detected propagation time will differ if the detected signal waveform differs. That is, in FIG. 8, propagation delay time 1 and propagation delay time 2 have vibrations input at the same point, and therefore, originally the same values must be detected, but the two values will differ from each other if waveform deformation occurs due to some factor. As a result, the coordinate input apparatus will effect wrong detection as if it detected oscillation input from different points. This means a degradation in the accuracy of the coordinate input apparatus. Accordingly, in order to realize a highly reliable coordinate input apparatus, there is required such a construction that can always detect the same detection signal waveform.

As described above, the generation of the directionality of the input pen reduces the accuracy of the coordinate calculation of the coordinate input apparatus of this kind, and in order to realize a highly accurate and highly reliable coordinate input apparatus, there is required some countermeasure.

SUMMARY OF THE INVENTION

The present invention has been made in view of the above-noted problem and has as its object to provide a molded article of the tip of an input pen for use for the inputting of the coordinates of a coordinate input apparatus which can mitigate the generation of the directionality thereof, and a coordinate input apparatus.

In an embodiment of the present invention, there is provided a molded article of the tip of an input pen for a coordinate input apparatus for inputting an oscillation to an oscillation transmitting plate, detecting an oscillation propagating the oscillation and detecting indicated coordinates, characterized in that the molded article is molded by injecting a composition containing at least liquid crystalline resin into a mold member for molding the configuration of the pen tip.

BRIEF DESCRIPTION OF THE DRAWINGS

FIG. 9A and FIG. 9B are a plan view and a side view, respectively.

DESCRIPTION OF THE PREFERRED EMBODIMENT

A preferred embodiment of the present invention will hereinafter be described in detail with reference to the drawings.

Reference is first made to describe the structure of the essential portions of an oscillatory pen used in the coordinate input apparatus of the present invention.

<Construction of the Pen (FIG. 1)>

Figure 1:
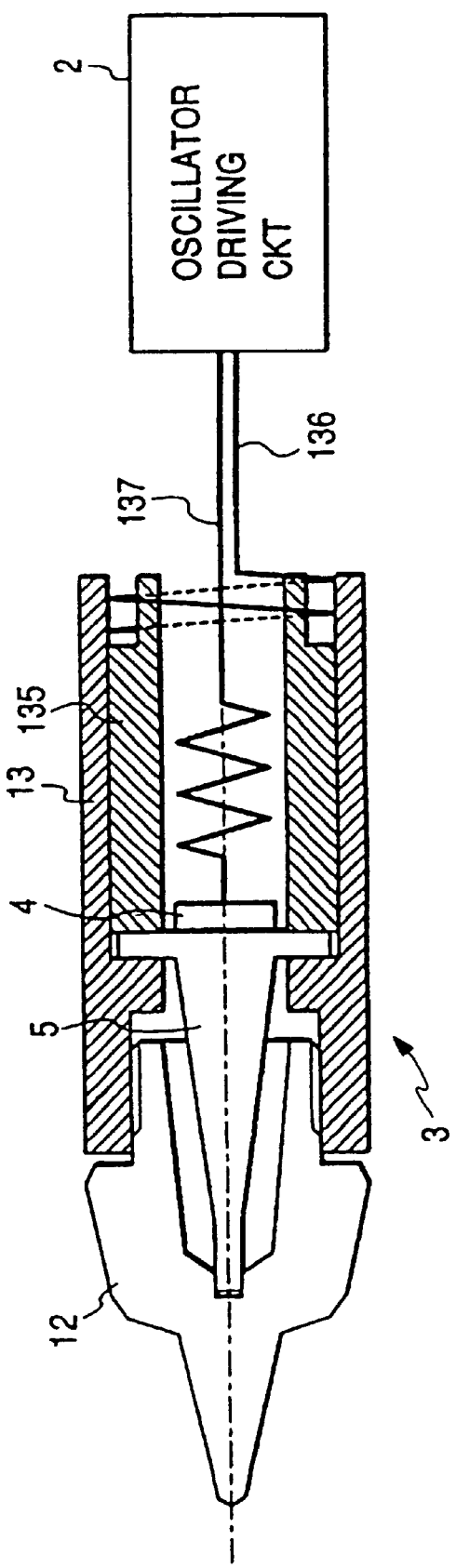
FIG. 1 shows the structure of the essential portions of an oscillatory pen according to an embodiment of the present invention.

FIG. 1 shows the structure of the essential portions of the oscillatory pen according to an embodiment of the present invention.

In FIG. 1, an oscillator 4 contained in the oscillatory pen 3 is driven by an oscillator driving circuit 2 which will be described later. An electrical driving signal is converted into a mechanical ultrasonic oscillation by the oscillator 4. The mechanical ultrasonic oscillation is transmitted to a pen tip 12 through an oscillation transmitting member 5, and the pen tip 12 contacts with an oscillation transmitting plate 8 (see FIG. 2) which will be described later, whereby the oscillation enters the oscillation transmitting plate 8.

The oscillator 4 is of a disc-like shape and, in the present embodiment, a thickness oscillation mode in which the direction of polarization and the direction of oscillation are parallel to each other is utilized, and the oscillator 4 is attached to the large end surface of the oscillation transmitting member 5 by an adhesive agent. In the present embodiment, the oscillation transmitting member 5 is made of aluminum (this is for the purpose of efficiently transmitting the oscillation, and the oscillation transmitting member 5 may be made of another metal such as stainless steel), and is positioned by an electrically conductive holder 13 so that the axis thereof may coincide, and is fixed by a bolt 135. Of course, the outer periphery of the holder 13 may be covered, for example with a rubber-like insulator to thereby improve the feeling of grip thereof.

One electrode of the oscillator 4 is connected to the oscillator driving circuit 2 through the oscillation transmitting member 5, the holder 13 and an electrode spring B 137. The other electrode of the oscillator 4 is connected to the oscillator driving circuit 2 through an electrode spring A 136. The oscillator driving circuit 2 may be stored in the housing of the oscillatory pen 3 or may be constructed on the same substrate as a processing circuit such as an arithmetic control circuit 1 (see FIG. 2) which will be described later.

The pen tip 12 is positioned so that the axis thereof may coincide with that of the small end surface of the oscillation transmitting member 5. The pen tip 12 is fixed with the holder 13 by screw fastening so that a pressure contact force may be generated in the portion of contact between the pen tip 12 and the small end surface of the oscillation transmitting member 5. As described above, the oscillation transmitting member 5 is interposed between the oscillator 4 which is an oscillation generating source and the pen tip 12, whereby the interchange of the pen tip 12 can be made easy to do. Also, against the wear of the pen tip 12, design is made such that a user himself can interchange any worn-out pen tip 12.

The specification required of the pen tip 12 of the oscillatory pen 3 is that, firstly, the oscillation generated by the oscillator 4 can be caused to efficiently enter the vibration transmitting plate 8. Secondly, the oscillation transmitting plate 8 must not be damaged when the oscillation enters it. For the first condition, a metallic material such as aluminum or stainless steel is generally small in energy loss and is handled as an optimum material for the oscillation transmitting plate 8, but there arises the problem that the oscillation transmitting plate 8 is damaged during the inputting of coordinates. On the other hand, for the second condition, resin can be said to be a more preferable material than metals.

With these conditions taken into account, in the present embodiment, the following specification is adopted for the oscillation transmitting member 5 and the pen tip 12 for the oscillation of the oscillator 4 to enter the oscillation transmitting plate 8. First, aluminum is used as the material of the oscillation transmitting member 5. Therefore, the loss of oscillatory energy is small, and it becomes possible to sufficiently transmit the oscillation from the oscillator 4 even if the axial length thereof becomes relatively great. Further, aluminum is electrically conductive and therefore serves also as a member for conducting with the electrodes of the oscillator 4.

Also, the pen tip 12 of resin provided on the tip end portion of the oscillation transmitting member 5 is directed to prevent damage to the oscillation transmitting plate 8 or improve the wear resistance of the pen tip 12 itself. As the pen tip, one using polyamide-imide is known and has a greatly reduced oscillation propagating characteristic as compared with metals, but among resins, it exhibits a marked oscillation transmitting characteristic. By interposing the oscillation transmitting member 5, the distance over which the oscillation must be transmitted (the distance from a position at which the pen tip 12 bears against the oscillation transmitting member 5 to a portion in which the pen tip 12 contacts with the oscillation transmitting plate 8) can be made short and the shape as a writing tool can be kept. Thereby, the reduction in the oscillation transmitting efficiency is improved.

Description will now be made of a coordinate input apparatus realizing the inputting of coordinates using the oscillatory pen 3 and a coordinate calculating method thereof. The construction of the coordinate input apparatus will first be described with reference to FIG. 2.

<Description of the Coordinate Input Apparatus (FIG. 2)>

Figure 2:
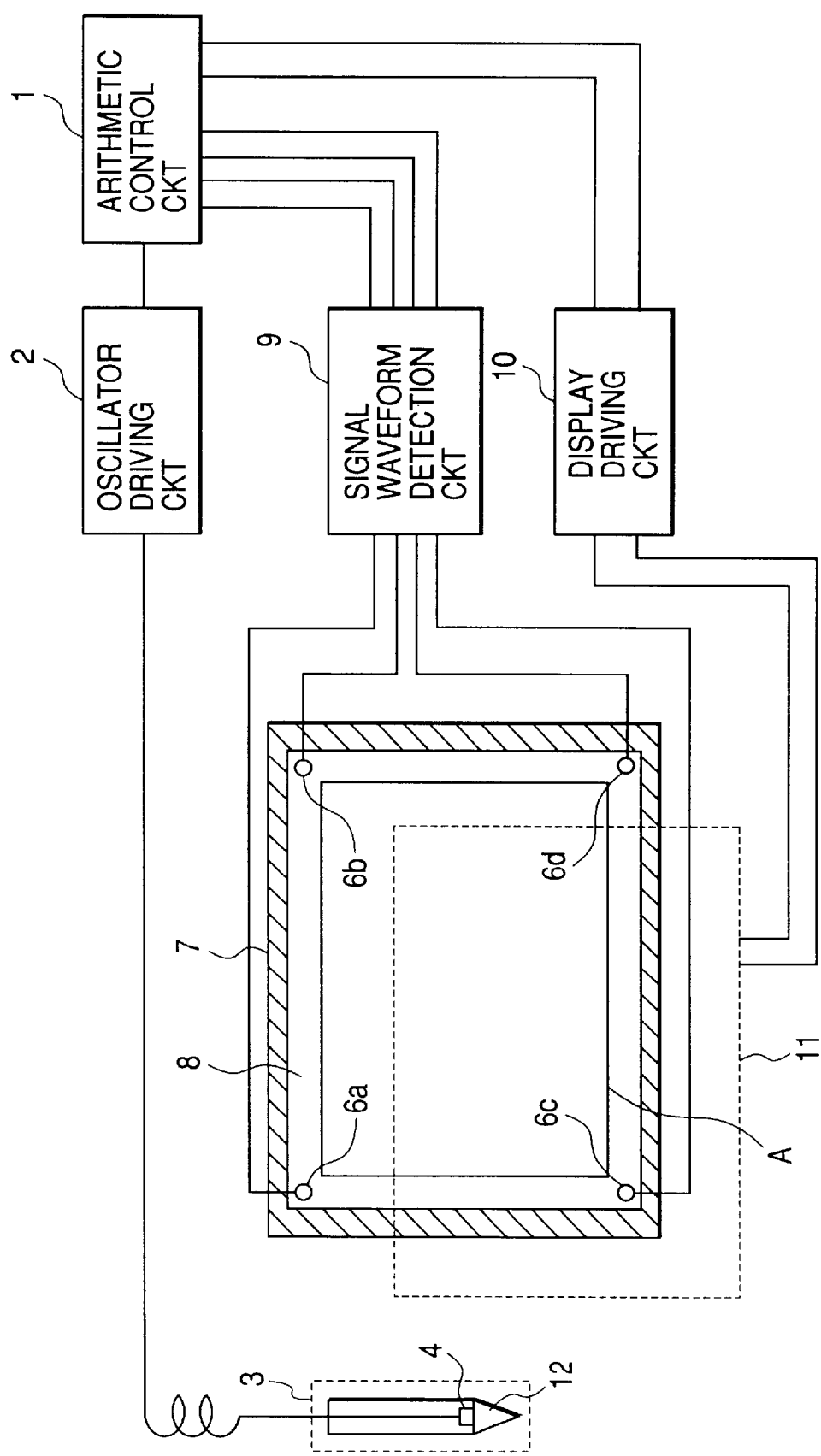
FIG. 2 shows the construction of a coordinate input apparatus according to an embodiment of the present invention.

In FIG. 2, reference numeral 1 designates an arithmetic control circuit for controlling the entire apparatus and calculating a coordinate position. Reference numeral 2 denotes an oscillator driving circuit for oscillating an oscillator 4 contained in an oscillatory pen 3. The oscillation generated by the oscillator 4 is input to an oscillation transmitting plate 8 through an oscillation transmitting member 5 (FIG. 5) and a pen tip 12.

The oscillation transmitting plate comprises a transparent member such as an acrylic or glass plate, and the inputting of coordinates by the oscillatory pen 3 is effected by touching a coordinate inputting effective area (an area A enclosed by solid line in FIG. 2 and hereinafter referred to as the effective area) on the oscillation transmitting plate 8. Also, an oscillation preventing material 7 for preventing the oscillation input by the oscillatory pen 3 from being reflected by the end surface of the oscillation transmitting plate 8 and returning to the central portion (attenuating the reflected wave) is provided on the outer periphery of the oscillation transmitting plate 8.

Oscillation sensors 6a–6d such as piezoelectric elements for converting mechanical oscillation into an electrical signal are fixed to the peripheral portion of the oscillation transmitting plate 8. Signals from the oscillation sensors 6a–6d are amplified by an amplifying circuit (not shown), and thereafter are sent to a signal waveform detection circuit 9. Signal processing is effected in the signal waveform detection circuit 9, and the result of the processing is output to the arithmetic control circuit 1, whereby coordinates are calculated. The details of the signal waveform detection circuit and the arithmetic control circuit 1 will be described later.

Reference numeral 11 designates a display such as a liquid crystal display capable of effecting the display of a dot unit, and disposed behind the oscillation transmitting plate 8. By the driving of a display driving circuit 10, a dot is displayed at a position traced by the oscillatory pen 3 and it is possible to see it through the oscillation transmitting plate 8 (when it is formed of a transparent material such as glass).

The oscillator 4 contained in the oscillatory pen 3 is driven by the oscillator driving circuit 2. The electrical driving signal of the oscillator 4 is supplied as a pulse signal of a low level from the arithmetic control circuit 1 and is amplified at a predetermined gain by the oscillator driving circuit 2, whereafter it is applied to the oscillator 4. The electrical driving signal is converted into a mechanical ultrasonic oscillation by the oscillator 4, and is transmitted to the oscillation transmitting plate 8 through the pen point 12.

Here, an oscillation frequency of the oscillator 4 is selected which can generate a plate wave in the oscillation transmitting plate 8. Also, the oscillation frequency of the oscillator 4 at this time is made into a resonance frequency including the oscillation transmitting member 5 and the pen tip 12, whereby efficient oscillation conversion becomes possible.

As described above, the elastic wave transmitted to the oscillation transmitting plate 8 is a plate wave and as compared with a surface wave or the like, it has the merit that it resists damage to the surface of the oscillation transmitting plate 8 and the influence of an obstacle or the like.

The details of the arithmetic control circuit will now be described with reference to FIG. 3.

<Description of the Arithmetic Control Circuit>

In the above-described construction, the arithmetic control circuit 1 outputs a signal for causing the oscillator driving circuit 2 to drive the oscillator 4 in the oscillatory pen 3 at each predetermined period (e.g., each 5 ms) and also, starts the time counting by an internal timer (comprised of a counter) therein. The oscillation generated by the oscillatory pen 3 arrives with a delay in conformity with the distance to the oscillation sensors 6a–6d.

The oscillation waveform detection circuit 9 detects the signals from the oscillation sensors 6a–6d, and produces a signal indicative of the oscillation arrival timing to the oscillation sensors 6a–6d by a waveform detection process which will be described later. Also, the arithmetic control circuit 1 inputs this signal to each of the oscillation sensors 6a–6d, and detects the oscillation arrival time to the oscillation sensors 6a–6d. The coordinate position of the oscillatory pen 3 is calculated by this detected oscillation arrival time. Also, the arithmetic control circuit 1 drives the display driving circuit 10 on the basis of this calculated coordinate position of the oscillatory pen 3 and controls the display by the display 11 or effects the outputting of the coordinates to an external apparatus by serial or parallel communication (not shown).

Figure 3:
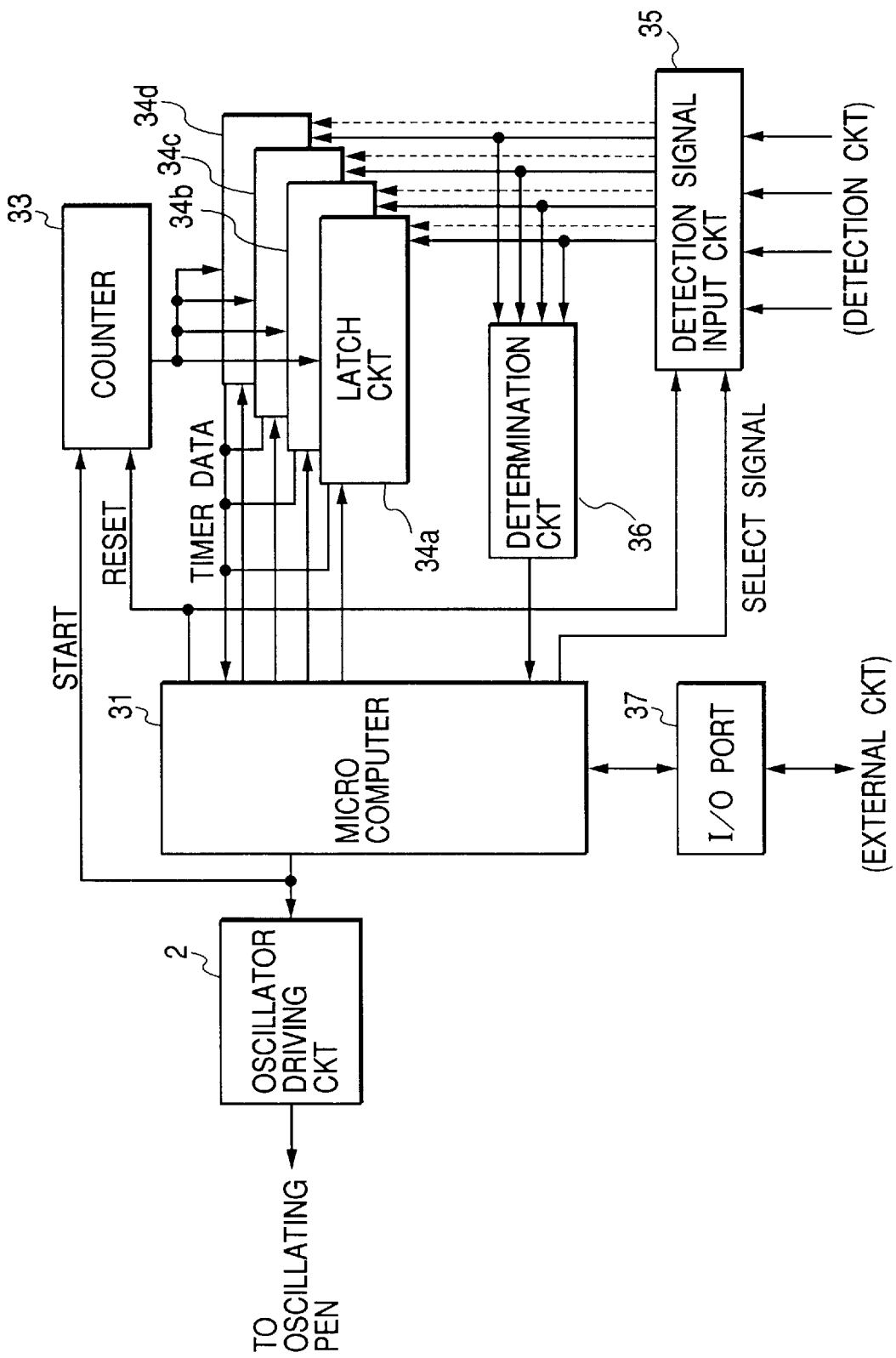
FIG. 3 is a block diagram showing the detailed construction of an arithmetic control circuit 1 according to an embodiment of the present invention.

FIG. 3 is a block diagram showing the detailed construction of the arithmetic control circuit 1 according to an embodiment of the present invention.

In FIG. 3, reference numeral 31 designates a microcomputer for controlling the arithmetic control circuit 1 and the entire coordinate input apparatus, and the microcomputer 31 is comprised of an internal counter, a ROM storing the operating procedure therein, a RAM used for calculation or the like, a non-volatile memory storing a constant, etc., therein, etc. Reference numeral 33 denotes a timer (comprised for example, of a counter or the like) for counting pulses of a reference clock (not shown), and when a start signal for starting the driving of the oscillator 4 in the oscillatory pen 3 is input to the oscillator driving circuit 2, the timer 33 starts time counting. Thereby, the starting of the time counting and the oscillation detection by the sensors are synchronized with each other and, thus, the delay time until the oscillation is detected by the oscillation sensors 6a–6d can be measured.

The oscillation arrival timing signals from the oscillation sensors 6a–6d output from the oscillation waveform detection circuit 9 are input to latch circuits 34a–34d through a detection signal input port 35. The latch circuits 34a–34d correspond to the oscillation sensors 6a–6d, respectively, and when they receive the oscillation arrival timing signals from the corresponding oscillation sensors, they latch the then time count value of the timer 33. When a determination circuit 36 determines that the reception of the oscillation arrival timing signals has been thus done by the oscillation sensors 6a–6d, the determination circuit 36 outputs a signal to that effect to the microcomputer 31.

When the microcomputer 31 receives the signal from the determination circuit 36, the oscillation arrival time from the latch circuits 34a–34d to the oscillation sensors 6a–6d is read from the corresponding latch circuits 34a–34d. Next, a predetermined calculation is effected on the basis of the read oscillation arrival time, and the coordinate position of the oscillatory pen 3 on the oscillation transmitting plate 8 is calculated. The calculated coordinate position is output to the display driving circuit 10 through the I/O port 37, whereby for example, information such as a dot can be displayed at a corresponding position on the display 11. Or the coordinate position is output to an interface circuit through the I/O port 37, whereby the coordinates position can be output to an external apparatus.

The process of oscillation transmission time detection and the detailed construction of the signal waveform detection circuit 9 will now be described with reference to FIGS. 4 and 5.

<Description of Oscillation Transmission Time Detection (FIGS. 4 and 5)>

Figure 4:
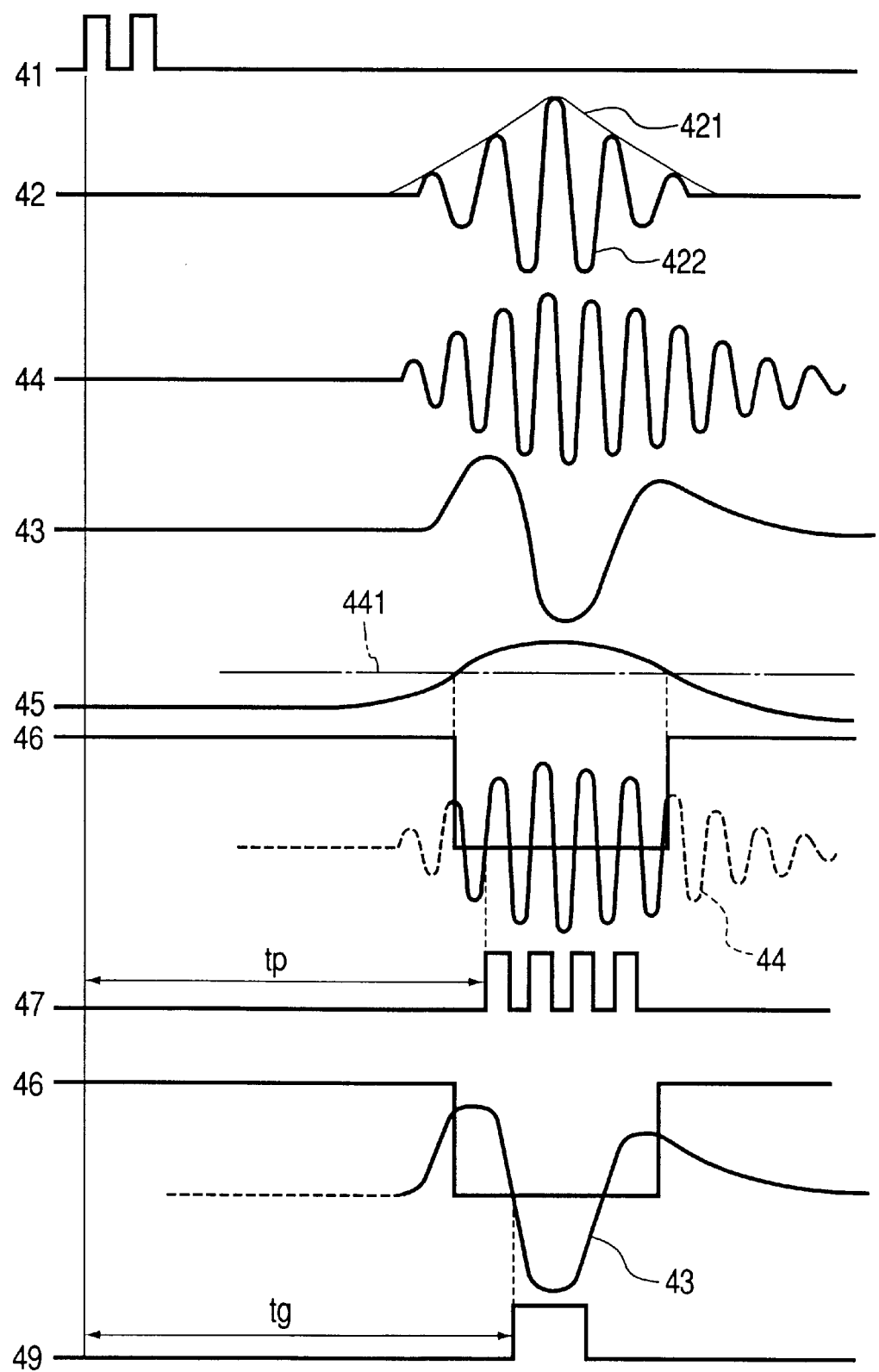
FIG. 4 is a graph for illustrating a detection waveform input to a signal waveform detection circuit according to an embodiment of the present invention, and a measuring process for an oscillation transmission time based thereon.

FIG. 4 is a graph for illustrating a detection waveform input to the signal waveform detection circuit in the embodiment of the present invention, and the measuring process for the oscillation transmission time based thereon.

Here, the case of the oscillation sensor 6a is described, but the same also holds true of the other oscillation sensors 6b, 6c and 6d and therefore, the details thereof will be omitted.

It has already been described that the measurement of the oscillation transmission time to the oscillation sensor 6a is started simultaneously with the outputting of the start signal to the oscillator driving circuit 2. At this time, a driving signal 41 is applied from the oscillator driving circuit 2 to the oscillator 4. By this driving signal 41, the ultrasonic oscillation transmitted from the oscillatory pen 3 to the oscillation transmitting plate 8 travels in a time conforming to the distance to the oscillation sensor 6a, whereafter it is detected by the oscillation sensor 6a. A signal 42 in FIG. 4 indicates a signal waveform detected by the oscillation sensor 6a.

The oscillation used in the present embodiment is a plate wave as previously described and therefore, the velocity at which the detected waveform propagates through an envelope 421 (group velocity Vg) and the velocity at which a phase 422 propagates (phase velocity Vp) differ from each other. Accordingly, for the transmission distance in the oscillation transmitting plate 8, the relation between the envelope 421 and phase 422 of the detected waveform changes in conformity with the transmission distance thereof during the oscillation transmission. In the present embodiment, the distance between the oscillatory pen 3 and the oscillation sensor 6a is detected from a group delay time tg based on the group velocity Vg and a phase delay time tp based on the phase velocity Vp.

Figure 5:
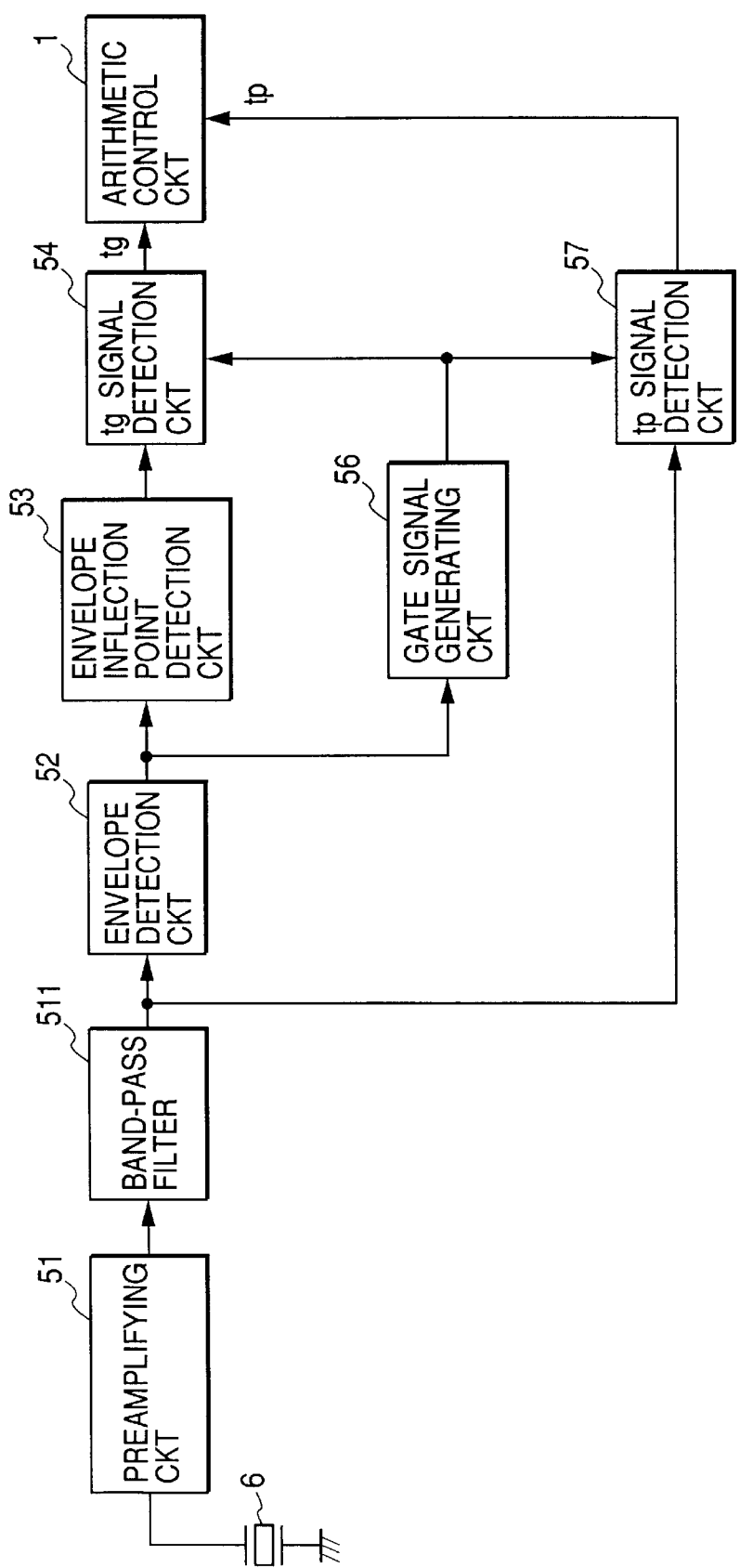
FIG. 5 is a block diagram showing the detailed construction of the signal waveform detection circuit according to an embodiment of the present invention.

FIG. 5 is a block diagram showing the detailed construction of the signal waveform detection circuit in the embodiment of the present invention.

A process for detecting the group delay time tg and the phase delay time tp will hereinafter be described with reference to FIG. 4.

The output signal 42 of the oscillation sensor 6a is amplified to a predetermined level by a pre-amplifier circuit 51. Thereafter, any excess frequency component of the detection signal is removed by a band-pass filter 511 to obtain a signal 44. Paying attention to the envelope of this signal 44, the sound velocity at which the waveform thereof transmits is the group velocity Vg, and when a particular point on the waveform, for example, the peak of the envelope or the inflection point of the envelope is detected, a delay time tg concerned with the group velocity Vg is obtained. So, the signal amplified by the pre-amplifier circuit 51 and passed through the band-pass filter 511 is input to an envelope detection circuit 52 comprised of an absolute value circuit and a lowpass filter or the like, and only the envelope 45 of the detection signal is taken out. Further, a gate signal generation circuit 56 comprised of a multi-vibrator or the like produces a gate signal 46 of a portion exceeding a threshold level 441 preset for this envelope 45.

To detect the group delay time tg concerned with the group velocity Vg, as previously described, the peak or the inflection point or the like of the envelope can be detected, but in the case of the present embodiment, the first inflection point of the envelope (the zero cross point of the falling of a signal 43 which will be described later) is detected. So, the signal 45 output by the envelope detection circuit 52 is input to an envelope inflection point detection circuit 53 to thereby obtain the twice differentiated waveform signal 43 of the envelope. This twice differentiated waveform signal 43 is compared with a gate signal 46, whereby a tg signal 49 which is an envelope delay time detection signal of a predetermined waveform is produced by a tg signal detection circuit 54 comprised of a multi-vibrator or the like, and is input to the arithmetic control circuit 1.

On the other hand, describing the phase delay time tp concerned with the phase velocity Vp, reference numeral 57 designates a tp signal detection circuit comprised of a zero cross comparator, a multivibrator or the like for detecting the phase delay time tp. The tp signal detection circuit 57 detects the zero cross point of the first rising of the phase signal 44 during the time for which the gate signal 46 is open, and supplies the signal 47 of the phase delay time tp to the arithmetic control circuit 1.

The foregoing description is about the oscillation sensor 6a, and of course, the same circuit may be provided for the other oscillation sensors 6b–6d and the sensors may be selected at time division by the use of an analog switch or the like to thereby make the circuit jointly owned.

A method of calculating the distance between the oscillatory pen 3 and the oscillation sensors 6a–6d will now be described with reference to FIG. 6.
<Description of the Calculation of the Distance Between the Oscillatory pen and the Sensors (FIG. 6)>

Description will hereinafter be made of a method of calculating the distance between the oscillatory pen 3 and the oscillation sensors 6a–6d on the basis of the group delay time tg and the phase delay time tp obtained in the manner described above.

Figure 6:
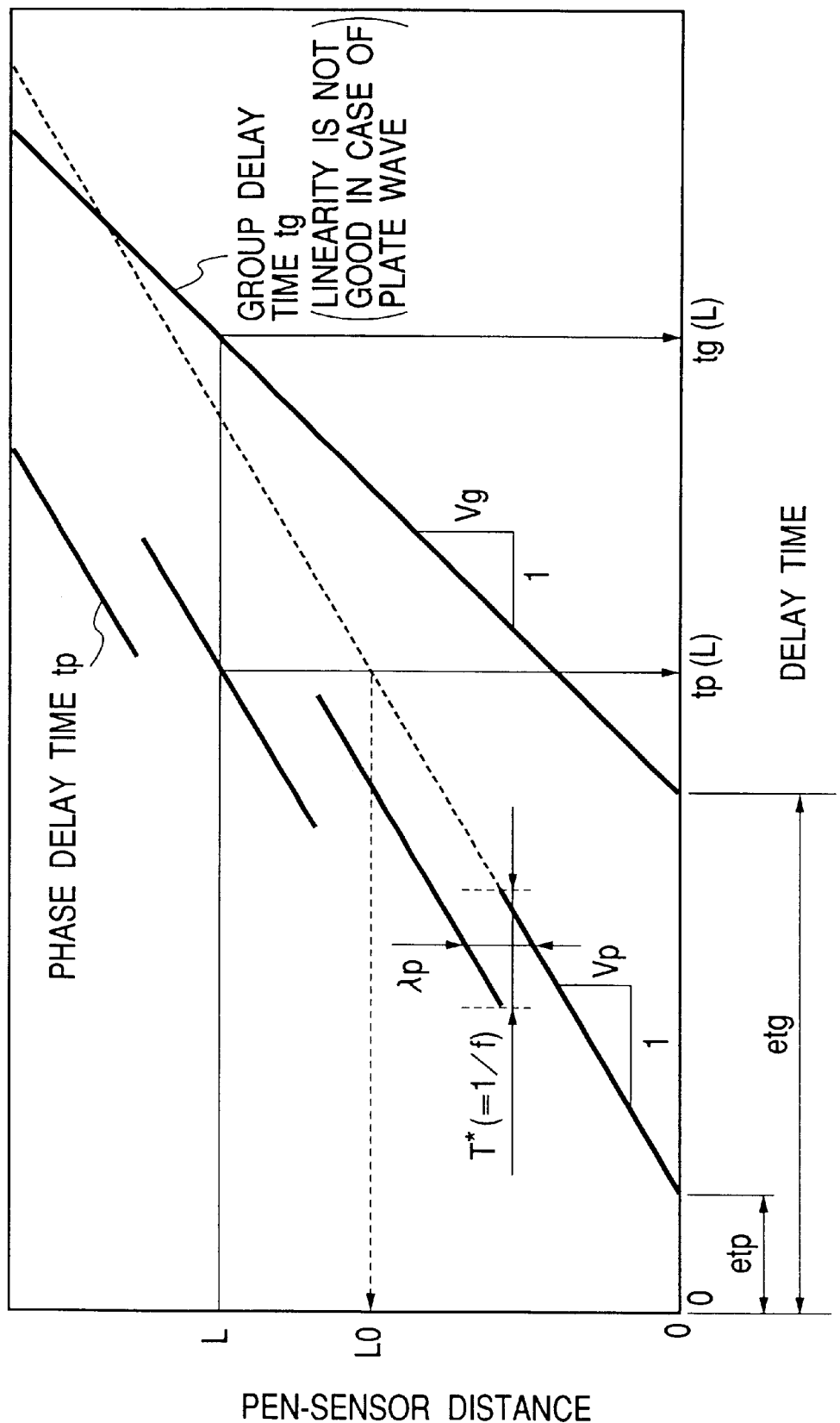
FIG. 6 is a graph showing the relations among a group delay time tg, a phase delay time tp and the distance between the pen and a sensor in an embodiment of the present invention.

FIG. 6 is a graph showing the relations among the group delay time tg, the phase delay time tp and the distance L between the pen and the sensors in this embodiment of the present invention.

In the present embodiment, a plate wave is used as the detection wave and therefore, the group delay time tg cannot be said to be good in linearity. Accordingly, when the distance L between the oscillatory pen 3 and the oscillation sensor 6a is to be found as the product of the group delay time tg and the group velocity Vg as shown in expression (1) below, the distance L cannot be found accurately.

$$L = Vg \cdot tg \tag{1}$$

So, in order to determine more highly accurate coordinates, a calculating process is carried out by expression (2) below on the basis of the phase delay time tp which is excellent in linearity.

$$L = Vp \cdot tp + n \cdot \lambda p, \tag{2}$$

where $\lambda p$ is the wavelength of the elastic wave, and n is an integer. The first term of the right side of expression (2) shows the distance L0 shown in FIG. 6, and as is apparent from FIG. 6, the difference between the distance L to be found and the distance L0 is an integer times as great as the wavelength (the width T* of the staircase on the time axis is a period of the signal waveform 44, and accordingly, T*=1/frequency, and if expressed in terms of distance, the width of the staircase is the wavelength $\lambda p$). Accordingly, by finding the integer n, the distance L between the pen and the sensors can be found accurately. So, from the above-mentioned expressions (1) and (2), the integer n can be found by expression (3) below.

$$n = \text{int}[(Vg \cdot tg - Vp \cdot tp)/\lambda p + \tfrac{1}{2}] \tag{3}$$

The reason why making an integer is executed in expression (3) is that the use of a plate wave as the detection wave cannot be said to be good in the linearity of the group delay time tg to the distance. A necessary sufficient condition for finding an accurate integer N is shown in expression (5) derived from expression (4) below.

$$n^* = (Vg \cdot tg - Vp \cdot tp)/\lambda p \tag{4}$$

$$\Delta N = n^* - n \leq 0.5 \tag{5}$$

That is, if the amount of error which occurs is within ±½ wavelength, the integer n can be accurately determined even if the linearity of the group delay time tg is not good. By substituting n found in the above-described manner for expression (2), the distance L between the oscillatory pen 3 and the oscillation sensor 6a can be measured accurately.

This expression is concerned with the oscillation sensor 6a, but by the same expression, the distances between the other three oscillation sensors 6b–6d and the oscillatory pen 3 can be obtained in a similar manner.

A method of correcting the circuit delay time will now be described with reference to FIGS. 6 and 7.
<Description of the Correction of the Circuit Delay Time>

The oscillation transmission time latched by latch circuits 34a–34d includes a phase circuit delay time etp and a group circuit delay time etg (see FIG. 6, and these times also include, besides the circuit delay time, a time for which oscillation propagates through the pen tip 12 of the oscillatory pen 3, etc.). The same amount of error created by these is always included when the transmission of oscillation is effected from the oscillatory pen 3 to the oscillation transmitting plate 8 and the oscillation sensors 6a–6d.

Figure 7:
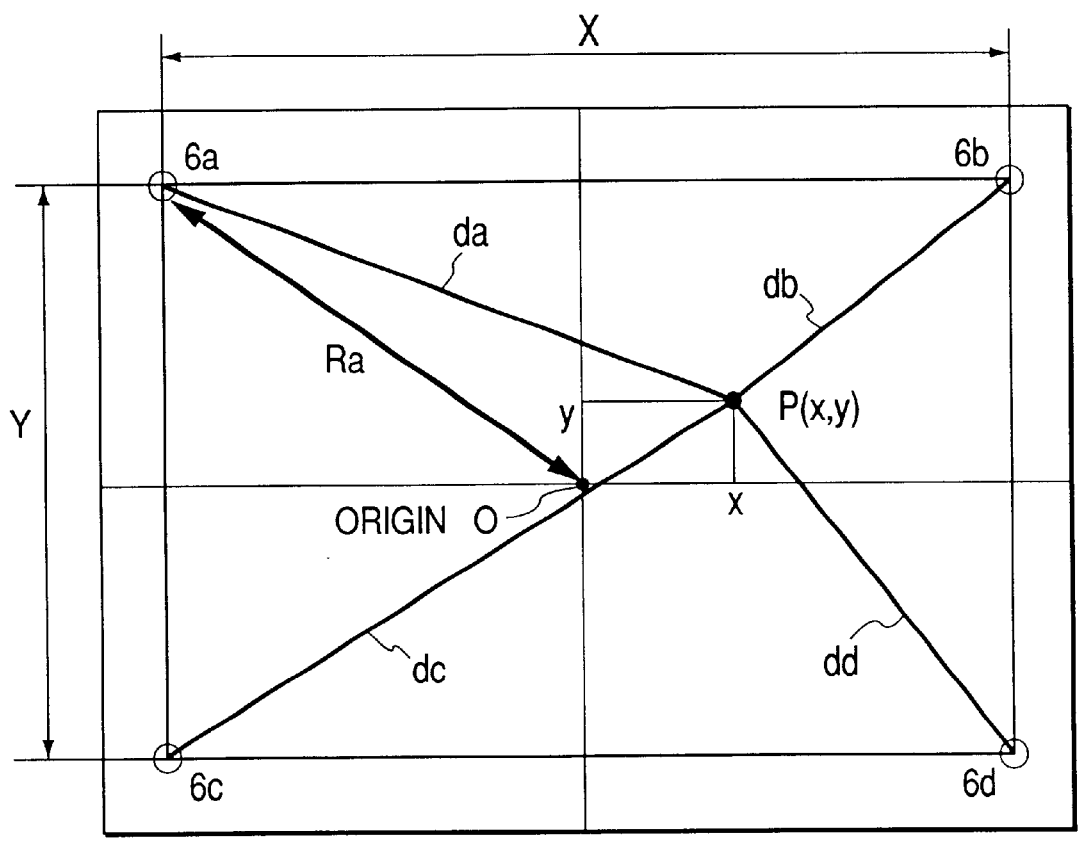
FIG. 7 is a graph for illustrating the principle of coordinate position calculation in an embodiment of the present invention.
Figure 8:
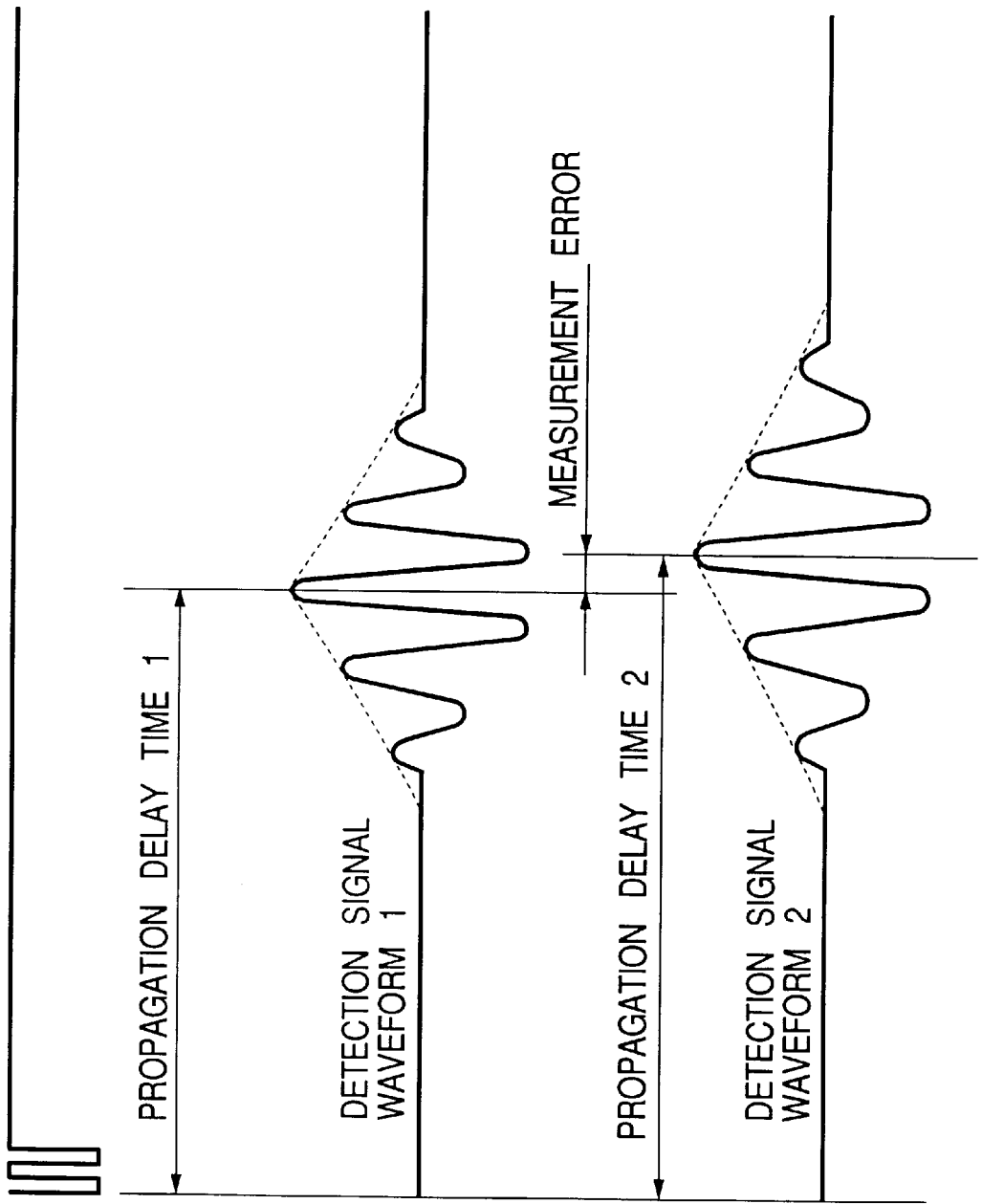
FIG. 8 is a supplementary graph for illustrating a task.

So, for example, let it be assumed that the distance from the position of the origin 0 in FIG. 7 to the oscillation sensor 6a is Ra(=sqr{$(X/2)^2+(Y/2)^2$}) (see FIG. 7). At the origin 0, inputting is effected by the oscillatory pen 3, and the actually measured oscillation transmission times from the origin 0 to the oscillation sensor 6a are defined as tg0* and tp0*. Also, if the transmission times required for the plate wave to actually propagate on the oscillation transmitting plate 8 from the origin 0 to the oscillation sensor 6a are defined as tg0 and tp0, there are the relations that $$tg0^* = tg0 + etg \tag{6}$$

$$tp0^* = tp0 + etp. \tag{7}$$

On the other hand, the actually measured values tg* and tp* at any input point p likewise are $$tg^* = tg + etg \tag{8}$$

$$tp^* = tp + etp. \tag{9}$$

The difference between expressions (6) and (8) and the difference between expressions (7) and (9) are $$tg^* - tg0^* = (tg + etg) - (tg0 + etg) = tg - tg0 \tag{10}$$

$$tp^* - tp0^* = (tp + etp) - (tp0 + etp) = tp - tp0. \tag{11}$$

Thereby, the phase circuit delay time etp and the group circuit delay time etg included in each transmission time are eliminated, and the accurate time difference between the time for which the wave propagates by a distance Ra and the time for which the wave propagates by a distance da can be found. Consequently, if expressions (1), (2) and (3) are used, the distance difference between the distance Ra and the distance da can be found. That is, as $$tg = tg^* - tg0^* \tag{12}$$

$$tp = tp^* - tp0^*, \tag{13}$$

the distance is calculated by the use of expressions (1), (2) and (3), and the distance Ra from the oscillation sensor 6a to the origin 0 is added to the value of the thus calculated distance. Thereby, the distance between the oscillatory pen 3 and the oscillation sensor 6a can be found accurately. Accordingly, if the distance Ra from the oscillation sensor 6a to the origin 0 and the times tg0* and tp0* measured at the origin 0 are stored in advance in a memory medium such as a non-volatile memory, the distance between the oscillatory pen 3 and the oscillation sensor 6a can be determined. Regarding the other oscillation sensors 6b–6d, the distances can be found by a similar procedure.

The principle of calculation of the coordinate position on the oscillation transmitting plate 8 by the oscillatory pen 3 will now be described with reference to FIG. 7.

<Description of the Calculation of the Coordinate Position (FIG. 7)>

FIG. 7 is a graph for illustrating the principle of calculation of the coordinate position in the embodiment of the present invention.

If as shown in FIG. 7, four oscillation sensors 6a–6d are provided at the four corners of the oscillation transmitting plate 8, the straight distances da, db, dc and dd (da–dd) from the position of the oscillatory pen 3 to the positions of the respective oscillation sensors 6a–6d can be found on the basis of the previously described procedure. Further, in the arithmetic control circuit 1, on the basis of these straight distances da–dd, the coordinates (x, y) of the position p of the oscillatory pen 3 can be found from the theorem of three squares in the manner shown in the following expressions:

$$x = (da + db) \cdot (da - db)/2X \tag{14}$$

$$y = (da + dc) \cdot (da - dc)/2Y, \tag{15}$$

where X and Y are the distance between the oscillation sensors 6a and 6b and the distance between the oscillation sensors 6c and 6d, respectively, and in the manner described above, the coordinates of the oscillatory pen 3 can be calculated in real time.

Also, in the above-described calculation, the coordinates are calculated by the use of the distances to the three oscillation sensors, but in the present embodiment, the four oscillation sensors 6a–6d are installed and therefore, the distances to three of those four oscillation sensors can be used for the calculation of the coordinates of the oscillatory pen 3 and the distance to the remaining oscillation sensor can be used for the verification of the correctness of the coordinates. Also, without the use of the greatest distance to the oscillation sensor (the distance L between the oscillatory pen and the sensor becomes great and therefore the probability with which the level of the detection signal drops and is affected by noise becomes great), the distances to the remaining three oscillation sensors may be used to calculate the coordinates of the oscillatory pen 3.

While in the present embodiment, four oscillation sensors 6a–6d are disposed and the distances to three oscillation sensors are used to calculate the coordinates of the oscillatory pen 3, geometrically it is possible to calculate the coordinates of the oscillatory pen 3 if the distances to two or more oscillation sensors are used, and of course, the number of the oscillation sensors can be set in conformity with the specification of the product.

<Detailed Description of a Mold for Molding the Pen Tip of an Oscillatory Pen which Can Mitigate the Directionality of the Oscillatory Pen (1)>

As described above, the coordinate input apparatus according to the present embodiment uses a plate wave as the detection wave. It is the basic principle to measure the group delay time Tg concerned with the group velocity Vg and the phase delay time Tp concerned with the phase velocity Vp to thereby first derive the distance between the oscillation generating source and each oscillation sensor. Also, expressions (1) to (3) are used as the distance calculating expressions, and expression (5) has been shown as the necessary condition when they are used.

Figures 9A, 9B:
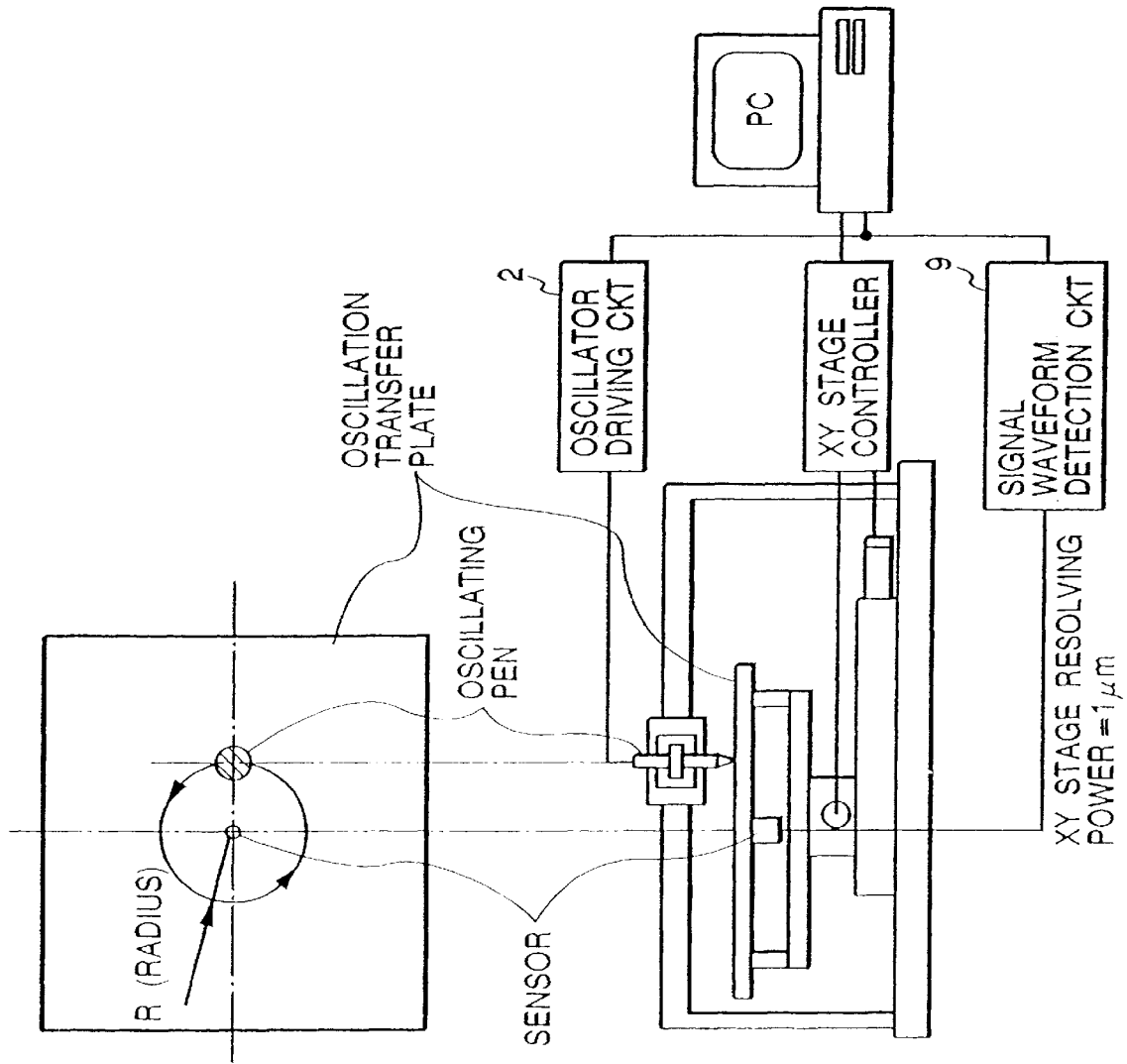
FIGS. 9A and 9B schematically show the construction of a measuring device for measuring the directionality of an embodiment of the present invention.

In view of the above-noted point, the measurement of the oscillation generated from the oscillatory pen 3 was effected by the use of a measuring device shown in FIGS. 9A and 9B. This measuring device is for measuring what behavior the oscillation generated from the oscillatory pen 3 exhibits when it spreads in the form of a ripple like a water ring about an oscillation input point as its center.

Describing the measuring method by this measuring device in detail, a sensor is disposed at the central portion of the oscillation transmitting plate 8 so that the oscillatory pen 3 may be scanned equidistantly on the circumference about the position of the sensor. When the oscillatory pen 3 makes a round of the sensor, the oscillatory pen 3 is driven 360 times at equal intervals. Then, a signal detected by the sensor is processed by the use of a processing circuit such as the arithmetic control circuit 1 shown in the above-described embodiment, and the group delay time tg and the phase delay time tp at each measuring point are detected (the measurement of the delay times is effected at each angle of 1°). When the integer-making error ΔN shown in expression (5) is found from the group delay time tg and the phase delay time tp obtained at the measuring point, 360 integer-making errors ΔN are obtained each time the oscillatory pen 3 makes a round. The difference between the maximum value and the minimum value of this integer-making error ΔN was defined as a numerical value indicative of the directionality of the oscillatory pen 3 when the oscillatory pen 3 made a round, and the measurement by the measuring device was repeated a plurality of times. The result is shown in Table 1 below.

In Table 1, there are shown the materials used for the pen tip and the average values and the minimum values of the directionality of the pen tip molded by those materials. Also, machining in Table 1 means that a round bar of polyamide-imide was extrusion-molded.

TABLE 1

| Pen Tip | | Directionality | |
|---|---|---|---|
| material | working method | average value | minimum value |
| polyamide-imide | machining | 0.22 | 0.34 |
| | molding | 0.27 | 0.43 |
| liquid crystal polymer | molding | 0.25 | 0.34 |

As shown in Table 1, in the molded article of polyamide-imide, the average value of directionality is very great (=0.43) and is approximate to the allowable value 0.5 of directionality. The above-mentioned integer-making error $\Delta N$ (the allowable value of which is 0.5) is generated not only by this directionality, but also by the non-linearity or noise or the like of the group delay time tg relative to the distance and therefore, it is desired to make directionality as small as possible. Thus, if the molded article of polyamide-imide is used, the allowable value of the integer-making error $\Delta N$ will be easily exceeded.

Examining the results of Table 1, when polyamide-imide is to be molded into a pen tip by machining, a round bar of polyamide-imide molded by extrusion molding is machined, whereby a pen tip is molded. The round bar thus molded by extrusion molding is considered to have an axial-symmetric mechanical characteristic. That is, a pen tip in which the axis of the round bar and the axis of a pen tip obtained by machining are coincident with each other can be molded and therefore, it is considered that relatively good directionality has been obtained. However, this suffers from the disadvantage that, as compared with molding, it requires many working steps and accordingly much cost. Also, when polyamide-imide is to be molded into a pen tip by molding, it is very difficult to mold it symmetrically with respect to the axis of the pen tip because polyamide-imide is a material which is high in viscosity and not good in fluidity. Also, such improvements to be symmetrical with respect to the axis of the pen tip (particularly the gate position and the gate type) have been proposed, but a good result has not yet been obtained. Therefore, to obtain a pen tip free of directionality, it is necessary to inspect and select pen tips by the above-described measuring device after molding.

As described above, when a pen tip is to be molded by the use of polyamide-imide, there has been the disadvantage that much cost is required or a pen tip which can mitigate directionality cannot be molded. So, the present invention solves the above-noted disadvantage by using liquid crystalline polymer from the following point of view.

When liquid crystalline polymer is to be molded into a pen tip by molding, graphite as a filler is mixed therewith with a view to improve the above-mentioned fluidity and mechanical strength and a pen tip is molded. This liquid crystalline polymer having graphite mixed therewith is excellent in fluidity as compared with polyamide-imide. Therefore, as can be seen from Table 1, a good result is obtained for the average value of directionality (this is equal to a machined article of polyamide-imide and is of a sufficient specification). Also, the reason why graphite is used as the filler is for preventing damage to the oscillation transmitting plate 8. It is also possible to use a glass filler (usually often used) as the filler, but particularly when the oscillation transmitting plate 8 is glass, it is confirmed that the glass is damaged and therefore, the use of graphite as the filler brings about the special effect that the injury of the oscillation transmitting plate 8 can be prevented.

Also, the pen tip formed of liquid crystalline polymer having graphite mixed therewith, as compared with the pen tip formed of polyamide-imide, has moderate durability and yet can improve the "sense of writing" a user feels when he brings the pen tip into contact with the oscillation transmitting plate 8 to make the pen tip write. Thereby, an oscillatory pen of good operability can be constructed. Also, as regards oscillation transmitting efficiency, a sufficient S/N ratio is obtained by the processing in the above-described signal waveform detection circuit 9, and the oscillatory pen has sufficient performance for the operation of inputting coordinates.

Further, graphite is mixed with the pen tip and therefore, an oscillatory pen using this pen tip can leave, for example, the locus when writing is effected on paper. Accordingly, there can also be constructed a coordinate input apparatus as will be described below.

In FIG. 2, the oscillation transmitting plate 8 is made of a material which can transmit oscillation (which material may be, for example, a metal (opaque) such as aluminum or of course, transparent glass). When coordinate data (locus information) is to be input, the user piles recording mediums such as paper on the oscillation transmitting plate 8, and inputs coordinates onto the paper by the use of the oscillatory pen using the above-described pen tip. In this case, the locus the user describes is recorded on the paper and the oscillation generated by the oscillatory pen is input to the oscillation transmitting plate 8 through the paper. This input oscillation is processed in accordance with the signal processing procedure in the above-described embodiment, and the position of the coordinates is calculated.

By such a construction being capable of being formed, the locus recorded on the paper can be intactly electronized as locus data, and a circuit for realizing the displaying function such as the display driving circuit 10 becomes unnecessary. Therefore, an input apparatus of good operability can be realized very inexpensively.

As described above, according to the present embodiment, an oscillatory pen using a pen tip formed of liquid crystalline polymer having graphite mixed therewith is used as an oscillatory pen used for the inputting of the coordinates of the coordinates input apparatus, whereby there can be realized such effects as 1) being capable of transmitting oscillation well to the oscillation transmitting plate 8,
2) being excellent in wear resistance, and
3) mitigating the directionality of the pen tip and thereby being capable of keeping the accuracy of coordinate calculation high.

Also, this pen tip makes the molding supporting mass production possible and moreover, does not require inspection such as selection and can therefore be produced at a low cost. Particularly, the pen tip is sooner or later reduced in operability by the wear due to the use thereof and gives rise to the necessity of interchanging the pen tip. Therefore, of course, the capability of producing the pen tip at a low cost contributes to a reduction in running cost, i.e., the mitigation of the user's burden.

As described above, according to the present invention, there can be provided the molded article of the pen tip of an input pen and a coordinate input apparatus which can mitigate the generation of the directionality of the input pen used for the inputting of the coordinates of the coordinate input apparatus.

<Detailed Description of a Mold for Molding the Pen Tip of an Oscillatory Pen which Can Mitigate the Directionality of the Oscillatory Pen (2)>

As described above, the coordinate input apparatus according to the present embodiment uses a plate wave as the detection wave. It is the basic principle to measure the group delay time tg concerned with the group velocity Vg and the phase delay time tp concerned with the phase velocity Vp to thereby first derive the distance from the oscillation generating source to each oscillation sensor. Also, expressions (1) to (3) are used as expressions for calculating the distance, and expression (5) has been shown as the necessary condition when they are used.

In view of the above-noted point, the measurement of the oscillation generated from the oscillatory pen 3 was effected by the use of a measuring device shown in FIGS. 9A and 9B. This measuring device is for measuring what behavior the oscillation generated from the oscillatory pen 3 exhibits when it spreads in the form of a ripple like a water ring about an oscillation input point as its center.

Describing the measuring method by this measuring device in detail, a sensor is disposed at the central portion of the oscillation transmitting plate 8 so that the oscillatory pen 3 may be scanned equidistantly circumferentially about the position of the sensor. The oscillatory pen 3 is driven 360 times at equal intervals when the oscillatory pen 3 makes a round of the sensor. A signal detected by the sensor is processed by the use of a processing circuit such as the arithmetic control circuit 1 shown in the above-described embodiment, and the group delay time tg and the phase delay time tp at each measuring point are detected (the measurement of the delay times is effected at each angle of 1°). When the integer-making error $\Delta N$ shown in expression (5) is found from the group delay time tg and the phase delay time tp obtained at the measuring point, 360 integer-making errors $\Delta N$ are obtained each time the oscillatory pen 3 makes a round. The difference between the maximum value and the minimum value of this integer-making error $\Delta N$ was defined as a numerical value indicative of the directionality of the oscillatory pen 3 when the oscillatory pen 3 made a round, and the measurement by the measuring device was repeated a plurality of times.

As the material of the pen tip 12 of the oscillatory pen 3 to be measured, use was made of two kinds of resin, i.e., polyamide-imide (hereinafter referred to as PAI) heretofore used and liquid crystalline polymer (hereinafter referred to as LCP). These two kinds of resin were selected from the viewpoint of satisfying the condition that they can transmit the oscillation generated by the oscillator 4 and do not damage the oscillation transmitting plate 8 which is an input surface during the inputting of coordinates. Also, the working conditions for the pen tip 12 are shown below.

1) The shape of the pen tip 12 is made from a round bar obtained by extrusion molding, by machining.
2) Molding by a mold of the same shape as the pen tip 12.
3) Molding by a first mold which will hereinafter be described.
4) Molding by a second mold which will hereinafter be described.

Figure 10:
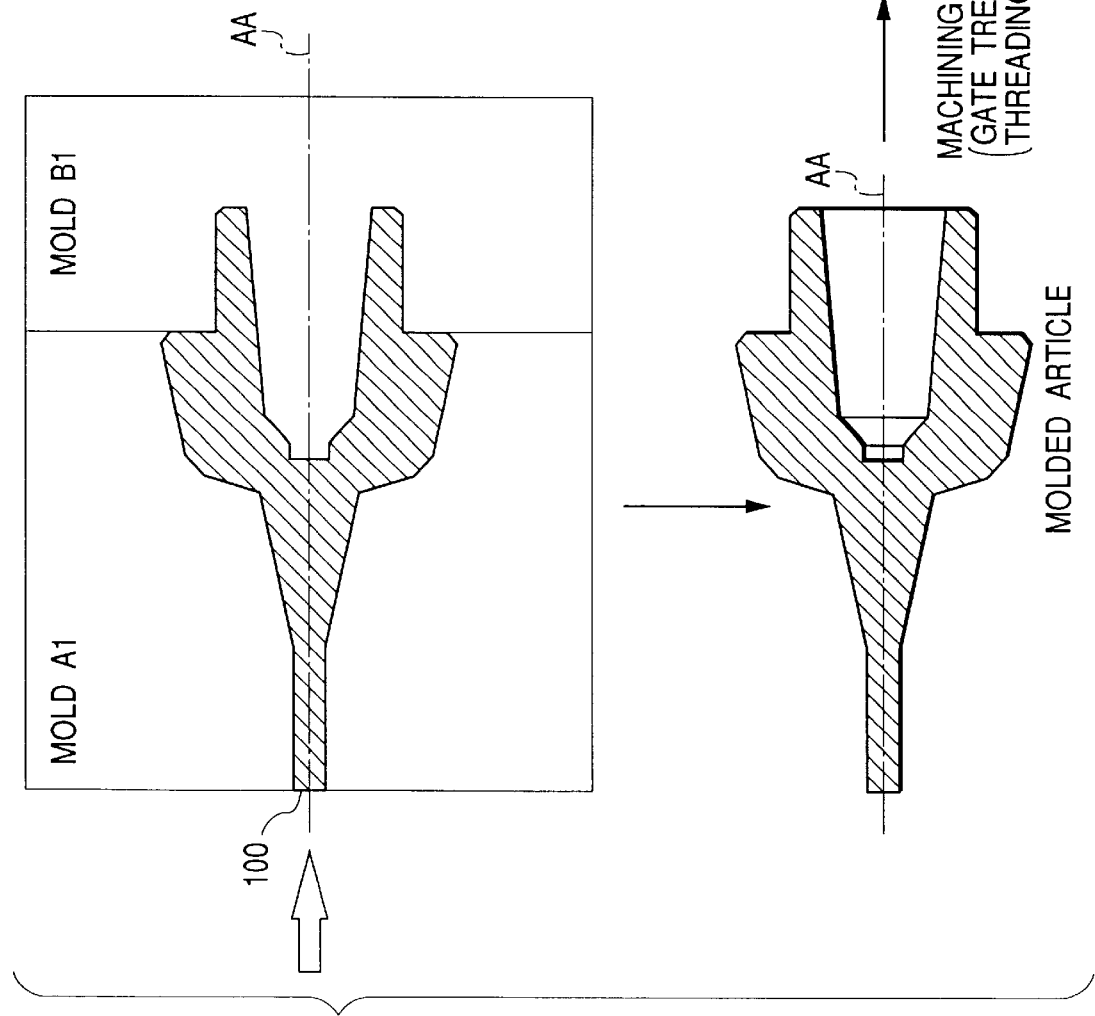
FIG. 10 shows the structure of a first mold according to an embodiment of the present invention.

The structure of the first mold comprising a mold A1 and a mold B1 is shown in FIG. 10. As shown in FIG. 10, a pin gate 100 is provided on the tip end portion of the pen tip of an axial-symmetric shape so as to coincide with the axis AA of the pen tip 12 so that resin can be poured in through the tip end portion. Accordingly, the resin for forming the pen tip 12 is supplied from the tip end portion of the first mold, and the resin flows through the first mold so as to become symmetric with respect to the axis AA of the pen tip 12. That is, the pen tip 12 molded by the first mold is axial-symmetric in its mechanical characteristic, and a good result can be obtained for the directionality of the oscillatory pen 3. Also, the pen tip 12 molded by the first mold is subjected to gate working (machining for rounding the tip end portion of the pen tip).

In the point that the gate is made symmetric with respect to the axis AA of the pen tip 12, of course, the gate may be provided in the portion wherein the pen tip 12 bears against the oscillation transmitting member 5, but herein, the gate 100 is provided in the tip end portion with the ease of the post-step taken into account.

Figure 11:
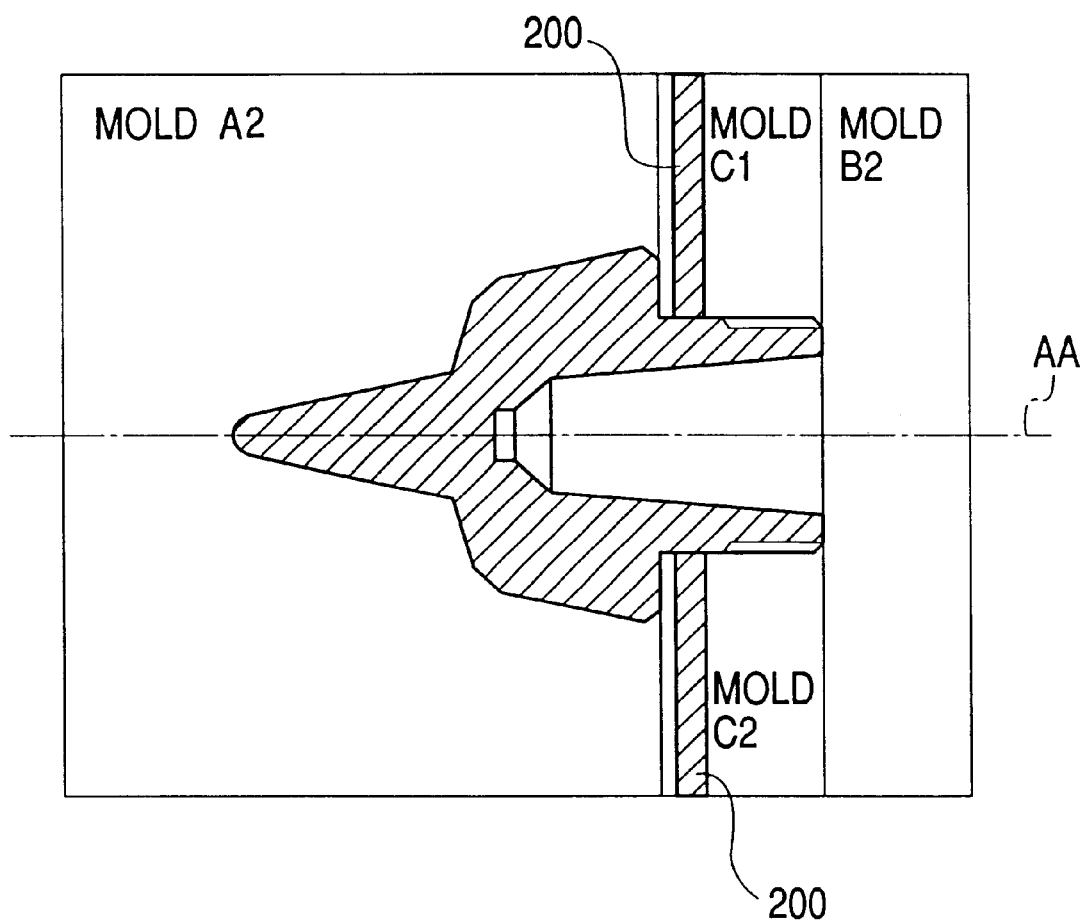
FIG. 11 shows the structure of a second mold according to the embodiment of the present invention.

On the other hand, the structure of the second mold comprising a mold A2, a mold B2, a mold C1 and a mold C2 is shown in FIG. 11. As shown in FIG. 11, side gates 200 are provided at two places so as to coincide with the axis AA of the pen tip 12. The positions of these side gates 200 are positions symmetric with respect to the axis AA of the pen tip 12 (positively opposed to each other), and in this point, the present embodiment differs from prior-art molded articles which are molded at one gate which is not at axial-symmetric positions. Also, by so constructing the pen tip 12, a screw portion for fixing the pen tip 12 can also be molded at the same time and moreover, the post-process for removing the gate portion may be only the cutting by a nipper, and as compared with the first mold, the pen tip can be manufactured inexpensively. While in the second mold, the gates 200 are provided at two places, the gates can also be provided at more than two places such as three places (at each 120° in the circumferential direction) or four places (at each 90° in the circumferential direction). Thereby, the generation of directionality can be more mitigated.

For the pen tips molded by the first mold and second mold described above, the measurement of directionality using the above-described measuring device was executed as well as the prior-art pen tip for the sake of comparison. The results of the measurement are shown in Table 2 below.

In Table 2, there are shown the average value and the minimum value of the directionality when the measurement for each pen tip was effected ten times. Also, machining in the table means that a round bar of polyamide-imide was extrusion-molded.

TABLE 2

| Pen Tip | | Directionality working | | |
|---|---|---|---|---|
| shape of mold | material | method | average value | minimum value |
| prior-art mold structure | PAI | machining | 0.22 | 0.34 |
| | PAI | molding | 0.27 | 0.43 |
| | LCP | molding | 0.25 | 0.34 |
| first mold | LCP | molding | 0.063 | 0.092 |
| second mold | LCP | molding | 0.082 | 0.19 |
| | PAI | molding | 0.12 | 0.19 |

The above-mentioned integer-making error $\Delta N$ (of which the allowable value is 0.5) occurs not only due to the directionality as shown in Table 2, but also to the non-linearity or noise or the like of the group delay time tg relative to the distance and therefore, it is desired to make the directionality as small as possible. As shown in Table 2, in the prior-art pen tip using PAI, the minimum value (=0.43)

of the directionality thereof is great and if such pen tip is intactly used, the allowable value of the integer-making error ΔN will be easily exceeded and the necessary condition during the calculation of coordinates cannot be satisfied. Also, in the prior-art pen tip using LCP, the minimum value of the directionality thereof is improved to some extent, but to improve the reliability thereof, further improvement is desired.

In contrast, in the pen tip using the first mold, the minimum value of the directionality thereof is greatly improved. Thereby, there can be obtained the effects that the improvement in reliability becomes remarkable. This means that for the allowable value 0.5 of the integer-making error ΔN, a sufficient margin is compensated for, and conversely speaking, there can also be obtained the excellent effect that the countermeasure for such a factor as noise can be simplified.

Also, in the pen tips using the second mold, the minimum value of the directionality thereof is improved as compared with the prior art, but in the point that the mechanical characteristic of the pen point is made axial-symmetric, they are considered to be inferior to the pen tip using the first mold. In fact, the improvement in the minimum value of the directionality of the pen tips using the second mold is not so great as that in the pen tip using the first mold. However, the feature of the pen tips using the second mold is that, as compared with the pen tip using the first mold, the simplification of the post-step (the working of the gate or the like) is possible, and the pen tips using the second mold are more advantageous in terms of cost.

As described above, the pen tip using the first mold of the present invention or the pen tips using the second mold can be said to be capable of being markedly improved in reliability as compared with the prior-art pen tips. Also, which of the first mold or the second mold is used to mold a pen tip is a matter of design the user selects from the viewpoints of performance and cost. As decision factors for selection, there are factors occurring besides the directionality of the pen tip for the allowable value 0.5 of the integer-making error ΔN (paying attention, for example, to noise, the value thereof differs depending on which of a liquid crystal display, a CRT or a PDP is adopted as an output apparatus), and after discerning the degree of those factors, the mold to be used for the molding of the pen tip can be selected.

Two specific molds for molding the pen tips have been described above, but if a mold provided with such a gate that when a pen tip is to be molded, the flow of resin becomes symmetric with respect to the axis of the pen tip is adopted, the directionality of the pen tip will of course be improved. For example, in a method of pouring resin from the circumferential direction symmetrically with respect to the axis of a pen tip by the use of a film gate to thereby mold a pen tip (this is of completely axial-symmetric structure and assumes performance equal to that of the method of molding a pen tip by the use of the first mold) or a method of molding a pen tip by the use of the second mold, a method of increasing the number of gates or the like can of course be adopted. Thus, in view of the necessary performance (directionality) and cost, the user can adopt a mold for molding a pen tip.

As described above, according to the present embodiment, the directionality of the pen tip is not generated and therefore, it becomes possible to ensure the necessary condition (integer-making error ΔN<0.5) of the measuring device in measurement to keep a state having a margin. That is, not only the wrong detection of coordinate becomes null, but also there can be obtained the excellent effects that the accuracy of coordinate calculation of the coordinate input apparatus is kept high.

Also, the pen tip can be made into a specification having a margin and therefore, the control of the manufacture thereof becomes easy, and there can also be obtained the excellent effects that the steps of the process including inspection can be greatly curtailed.

Further, the directionality of the pen tip is improved and therefore, the deformation of the waveform of the oscillation input by the oscillatory pen 3 becomes null so that stable oscillation can be input irrespective of the direction of the pen tip. As a result, there can also be obtained the excellent effects that there can be provided a coordinate input apparatus which can highly accurately calculate coordinates irrespective of the direction of the pen tip.

As described above, according to the present invention, in the input pen of a coordinate input apparatus, there can be provided a mold for molding the pen tip of the input pen which can mitigate the generation of directionality of the input pen and a method of molding the pen tip.

What is claimed is:

1. A mold for molding a pen tip of an input pen for inputting a mechanical vibration to a coordinate input apparatus, the apparatus detecting coordinates indicated by the input pen by detecting propagation of the mechanical vibration on a mechanical vibration transmitting plate, said mold comprising:

a mold member having a shape for forming, by molding, a configuration of the pen tip for transmitting the mechanical vibration to the mechanical vibration transmitting plate; and a gate formed in said mold member, for injecting resin into said mold, said gate being disposed on an axis of said mold member corresponding to a center axis of the pen tip, wherein a mechanical characteristic of the vibration of the pen tip is symmetry with respect to the center axis of the pen tip.

2. A mold according to claim 1, wherein the resin is polyamide-imide.

3. A mold according to claim 1, wherein the resin is liquid crystalline polymer.

4. A mold for molding a pen tip of an input pen for inputting a mechanical vibration to a coordinate input apparatus, the apparatus detecting coordinates indicated by the input pen by detecting propagation of the mechanical vibration on a mechanical vibration transmitting plate, said mold comprising:

a mold member having a shape for forming, by molding, a configuration of the pen tip, for transmitting the mechanical vibration to the mechanical vibration transmitting plate; and a plurality of gates formed in said mold member, for injecting resin into said mold, said gates being disposed at positions at even intervals in a circumferential direction about an axis of said mold member corresponding to a center axis of the pen tip, wherein a mechanical characteristic of the vibration of the pen tip is symmetry with respect to the center axis of the pen tip.

5. A method of molding a pen tip of an input pen for inputting a mechanical vibration to a coordinate input apparatus, the apparatus detecting coordinates indicated by the input pen by detecting propagation of the mechanical vibration on a mechanical vibration transmitting plate, said method comprising the steps of:

providing a mold member for forming, by molding, a configuration of the pen tip for transmitting the mechanical vibration to the mechanical vibration transmitting plate, with a gate disposed on an axis of the mold member corresponding to a center axis of the pen tip;

injecting resin into the gate; and effecting a working treatment of a molded body formed in said injecting step by the mold member into the pen tip, wherein a mechanical characteristic of the vibration of the pen tip is symmetry with respect to the center axis of the pen tip.

6. A method of molding a pen tip of an input pen for inputting a mechanical vibration to a coordinate input apparatus, the apparatus detecting coordinates indicated by the input pen by detecting propagation of the mechanical vibration on a mechanical vibration transmitting plate, said method comprising the steps of:

providing a mold member for forming, by molding, a configuration of the pen tip, for transmitting the mechanical vibration to the mechanical vibration transmitting plate, with a plurality of gates formed in the mold member at positions at even intervals in a circumferential direction about an axis of the mold member corresponding to a center axis of the pen tip;

injecting resin into the gates; and effecting a working treatment of a molded body formed in said injecting step by the mold member into the pen tip, wherein a mechanical characteristic of the vibration of the pen tip is symmetry with respect to the center axis of the pen tip.

7. A method according to claim 6, further comprising disposing a plurality of gates at positions symmetric with respect to the axis of the mold member corresponding to the center axis of the pen tip, and cutting off the gate portion of the molded body molded by the mold member in said working treatment step.

8. A molded pen tip article for a mechanical vibration input pen for a coordinate input apparatus, the apparatus calculating and outputting a coordinate position on a mechanical vibration transmitting plate indicated by the mechanical vibration input pen based on a delay time until elastic wave mechanical vibration input on the mechanical vibration transmitting plate by the mechanical vibration input pen arrives at mechanical vibration detection means, said molded pen tip article transmitting a mechanical vibration generated by a mechanical vibration generation device provided within the mechanical vibration input pen, said molded pen tip article comprising:

a composition including liquid crystalline resin containing a filler, wherein the composition is injected into a mold member for forming, by molding, a configuration of said pen tip article which transmits the mechanical vibration to a point on the mechanical vibration transmitting plate and which has a symmetric configuration with respect to a center axis of said pen tip article, wherein a mechanical characteristic of the vibration of said pen tip article is symmetry with respect to the center axis of said pen tip article.

9. A molded pen tip article according to claim 8, wherein the liquid crystalline resin is a liquid crystalline polymer.

10. A molded pen tip article according to claim 8, wherein the filler is graphite.

11. A coordinate input apparatus for detecting mechanical vibration propagating through a mechanical vibration transmitting plate and for detecting indicated coordinates, said apparatus comprising:

an input pen comprising an injection molded pen tip of a composition comprising liquid crystalline resin containing a filler, the pen tip transmitting the mechanical vibration to the mechanical vibration propagation plate and further having a symmetric configuration with respect to a center axis of the pen tip; and generating means disposed in said input pen for generating mechanical vibration, wherein a mechanical characteristic of the vibration of the pen tip is symmetry with respect to the center axis of the pen tip.

12. A coordinate input apparatus according to claim 11, wherein the liquid crystalline resin is a liquid crystalline polymer.

13. A coordinate input apparatus according to claim 11, wherein the filler is graphite.

* * * * *

UNITED STATES PATENT AND TRADEMARK OFFICE
CERTIFICATE OF CORRECTION

PATENT NO. : 6,563,493 B2
DATED : May 13, 2003
INVENTOR(S) : Katsuyuki Kobayashi et al.

It is certified that error appears in the above-identified patent and that said Letters Patent is hereby corrected as shown below:

<u>Title page,</u>
Item [56], References Cited, U.S. PATENT DOCUMENTS,
"4,705,943" should read -- 4,705,942 --.

<u>Column 7,</u>
Line 38, "multi-vibrator" should read -- multivibrator --.

<u>Coumn 13,</u>
Line 56, "a,round" should read -- a round --.

Signed and Sealed this

Twentieth Day of January, 2004

JON W. DUDAS
*Acting Director of the United States Patent and Trademark Office*